United States Patent
Niitani et al.

(10) Patent No.: US 11,984,597 B2
(45) Date of Patent: May 14, 2024

(54) SODIUM ION SECONDARY BATTERY

(71) Applicant: TOYOTA JIDOSHA KABUSHIKI KAISHA, Toyota (JP)

(72) Inventors: Keita Niitani, Shizuoka-ken (JP); Shin Ushiroda, Susono (JP); Hiroko Kuwata, Susono (JP); Masato Hozumi, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 116 days.

(21) Appl. No.: 17/236,593

(22) Filed: Apr. 21, 2021

(65) Prior Publication Data
US 2021/0399303 A1 Dec. 23, 2021

(30) Foreign Application Priority Data
Jun. 18, 2020 (JP) .................................. 2020-105307

(51) Int. Cl.
*H01M 4/60* (2006.01)
*H01M 4/36* (2006.01)
*H01M 4/587* (2010.01)
*H01M 10/054* (2010.01)
*H01M 10/0562* (2010.01)

(52) U.S. Cl.
CPC ............. *H01M 4/60* (2013.01); *H01M 4/364* (2013.01); *H01M 4/587* (2013.01); *H01M 10/054* (2013.01); *H01M 10/0562* (2013.01); *H01M 2300/0068* (2013.01)

(58) Field of Classification Search
CPC .......... H01M 10/054; H01M 10/0562; H01M 2300/0068; H01M 4/364; H01M 4/587; H01M 4/60; H01M 4/606; H01M 4/625; Y02E 60/10
See application file for complete search history.

(56) References Cited

U.S. PATENT DOCUMENTS

2015/0044558 A1   2/2015   Nakayama
2015/0180024 A1*  6/2015   Nose ................... H01M 4/5805
                                              429/223
2022/0190338 A1*  6/2022   Barker ................ H01M 10/054

FOREIGN PATENT DOCUMENTS

JP   2013-168343 A    8/2013
JP   2015037016 A     2/2015

OTHER PUBLICATIONS

Machine Translation JP2013168343A abstract (Year: 2013).*
Yang Xu et al.; "Organic materials for rechargeable sodium-ion batteries"; Materials Today; vol. 21, No. 1; Jan./Feb. 2018; pp. 60-78.
L Duchêne, et al., "A stable 3 V all-solid-state sodium-ion battery based on a closo-borate electrolyte", Energy & Environmental Science, The Royal Society of Chemistry. (2017) 2609-2615, 7 pages.

* cited by examiner

*Primary Examiner* — Victoria H Lynch
(74) *Attorney, Agent, or Firm* — SoraIP, Inc.

(57) ABSTRACT

A sodium ion secondary battery includes a cyclic organic compound as an active material and a complex hydride as a solid electrolyte, wherein the cyclic organic compound has at least two carbonyl groups —C(=O)—, the at least two carbonyl groups are bonded via a single bond or at least one conjugated double bond, and the complex hydride includes a Na cation and a complex ion containing H.

11 Claims, 1 Drawing Sheet

SODIUM ION SECONDARY BATTERY

CROSS-REFERENCE TO RELATED APPLICATION

This application claims priority to Japanese Patent Application No. 2020-105307 filed on Jun. 18, 2020, incorporated herein by reference in its entirety.

BACKGROUND

1. Technical Field

The present disclosure discloses a sodium ion secondary battery.

2. Description of Related Art

Japanese Unexamined Patent Application Publication No. 2015-037016 (JP 2015-037016 A) discloses an aromatic compound having an aromatic ring structure and two or more COONa groups bonded to the aromatic ring structure as an active material of a sodium ion battery. In addition. JP 2015-037016 A discloses a liquid electrolyte, a gel electrolyte and a solid electrolyte as electrolytes combined with the active material. Anon-aqueous electrolytic solution is disclosed as the liquid electrolyte, a gel obtained by adding a polymer to a non-aqueous electrolytic solution is disclosed as the gel electrolyte, and an oxide solid electrolyte and a sulfide solid electrolyte are disclosed as the solid electrolyte.

SUMMARY

According to findings of the inventors, in a sodium ion battery including a predetermined cyclic organic compound as an active material and a non-aqueous electrolytic solution as an electrolyte, the capacity retention rate of the battery tends to decrease when charging and discharging are repeated while the cyclic organic compound is dissolved in the non-aqueous electrolytic solution. In addition, according to findings of the inventors, a sodium ion battery including a predetermined cyclic organic compound as an active material and an oxide solid electrolyte or a sulfide solid electrolyte as an electrolyte tends to have a large interfacial resistance between the active material and the solid electrolyte.

An aspect of the present disclosure relates to a sodium ion secondary battery including a cyclic organic compound as an active material and a complex hydride as a solid electrolyte, wherein the cyclic organic compound has at least two carbonyl groups —C(O) and the at least two carbonyl groups are bonded via a single bond or at least one conjugated double bond, and wherein the complex hydride includes a Na cation and a complex ion containing H.

In the sodium ion secondary battery of the present disclosure, the cyclic organic compound may have an unsaturated cyclic structure.

In the sodium ion secondary battery of the present disclosure, the cyclic organic compound may be an aromatic compound, and the aromatic compound may have an aromatic ring structure and two or more COONa groups bonded to the aromatic ring structure.

In the sodium ion secondary battery of the present disclosure, the aromatic compound may have one aromatic ring structure and two COONa groups bonded to the aromatic ring structure.

In the sodium ion secondary battery of the present disclosure, the cyclic organic compound may be composited with a carbon material.

In the sodium ion secondary battery of the present disclosure, the complex ion may contain B.

The sodium ion secondary battery of the present disclosure may include the cyclic organic compound as a negative electrode active material.

The sodium ion secondary battery of the present disclosure may include a positive electrode active material layer, a negative electrode active material layer, and a solid electrolyte layer, wherein the solid electrolyte layer may be disposed between the positive electrode active material layer and the negative electrode active material layer, wherein one of the positive electrode active material layer and the negative electrode active material layer may contain the cyclic organic compound as the active material, and wherein at least one of the positive electrode active material layer containing the cyclic organic compound, the negative electrode active material layer containing the cyclic organic compound, and the solid electrolyte layer may contain the complex hydride as the solid electrolyte.

In the sodium ion secondary battery, when the cyclic organic compound as the active material and the complex hydride as the solid electrolyte are used, it is easier to reduce the interfacial resistance between the active material and the solid electrolyte than when an oxide solid electrolyte or a sulfide solid electrolyte is used as the solid electrolyte. In addition, in the sodium ion secondary battery, when the cyclic organic compound as the active material and the complex hydride as the solid electrolyte are used, the problem of dissolution of the cyclic organic compound in the electrolyte is unlikely to occur, and it is easy to increase the capacity retention rate of the battery when charging and discharging are repeated.

BRIEF DESCRIPTION OF THE DRAWINGS

Features, advantages, and technical and industrial significance of exemplary embodiments of the disclosure will be described below with reference to the accompanying drawings, in which like sings denote like elements, and wherein.

DETAILED DESCRIPTION OF EMBODIMENTS

Figure 1:
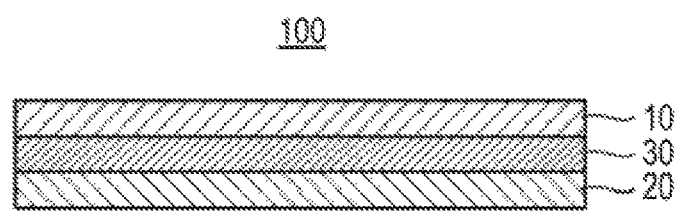
FIG. 1 is a schematic diagram for explaining an example of a configuration of a sodium ion secondary battery.

A sodium ion secondary battery of the present disclosure includes a cyclic organic compound as an active material and a complex hydride as a solid electrolyte. The cyclic organic compound has at least two carbonyl groups —C(=O)—. The at least two carbonyl groups are bonded via a single bond or at least one conjugated double bond. The complex hydride includes a Na cation and a complex ion containing H.

1. Active Material

The sodium ion secondary battery of the present disclosure includes a predetermined cyclic organic compound as an active material. The sodium ion battery of the present disclosure may include a cyclic organic compound as a positive electrode active material or as a negative electrode active material. In the sodium ion secondary battery of the present disclosure, one of the positive electrode active material and the negative electrode active material may be composed of only a cyclic organic compound. Alternatively, in one of the positive electrode active material and the negative electrode active material, the cyclic organic compound and an active material other than the cyclic organic compound may be combined as necessary.

The cyclic organic compound has a cyclic structure in at least a part. The cyclic structure may be a saturated cyclic structure or an unsaturated cyclic structure as described below. In addition, the cyclic organic compound has at least two carbonyl groups. In the present disclosure, the carbonyl group —C(=O)— also includes, for example, a carboxylic group. In the cyclic organic compound, at least a carbonyl group is bonded via a single bond or at least one conjugated double bond. The conjugated double bond can be represented by, for example, —(C=C—C)$_n$— (n is a natural number). In the cyclic organic compound, when at least two carbonyl groups are bonded via a single bond or at least one conjugated double bond, such a cyclic organic compound can occlude and release sodium ions at a predetermined potential using a carbon-oxygen double bond of a carbonyl group or a conjugated double bond as shown in the following chemical formulae. That is, it can function as an active material for a sodium ion secondary battery. Here, the following chemical formulae are only examples, and in addition to compounds represented by the following chemical formulae, various cyclic organic compounds can function as an active material of a sodium ion secondary battery (Yang Xu et al, "Organic materials for rechargeable sodium-ion batteries". Materials Today, Volume 21, Number 1, January/February 2018, P 60-78).

Chemical Formulae (2) to (5). In addition, the cyclic organic compound may be an aromatic compound. In this case, as exemplified in Chemical Formula (2), the aromatic compound may have an aromatic ring structure and two or more COONa groups bonded to the aromatic ring structure.

In the cyclic organic compound, carbon atoms constituting the carbonyl group may form a ring of a cyclic organic compound as exemplified in Chemical Formulae (1) and (3) to (5) or do not form a ring of a cyclic organic compound as exemplified in Chemical Formula (2) and may be bonded directly or indirectly to carbon atoms forming the ring.

In the cyclic organic compound, when the at least two carbonyl groups are bonded via at least one conjugated double bond, the conjugated double bond may be included in a ring of the cyclic organic compound as exemplified in Chemical Formulae (2) to (5). In other words, the conjugated double bond may be formed by carbon atoms forming the ring. In this regard, as described above, the cyclic structure of the cyclic organic compound may be an unsaturated cyclic structure.

In the cyclic organic compound, when at least two carbonyl groups are bonded via at least one conjugated double bond, the number of conjugated double bonds that bond the carbonyl groups may be 1 or more, 2 or more, 3 or more or 4 or more. The upper limit of the number of conjugated double bonds is not particularly limited as long as it can function as an active material. For example, it may be 10 or less, 9 or less, 8 or less, 7 or less, 6 or less, S or less, 4 or less, 3 or less or 2 or less.

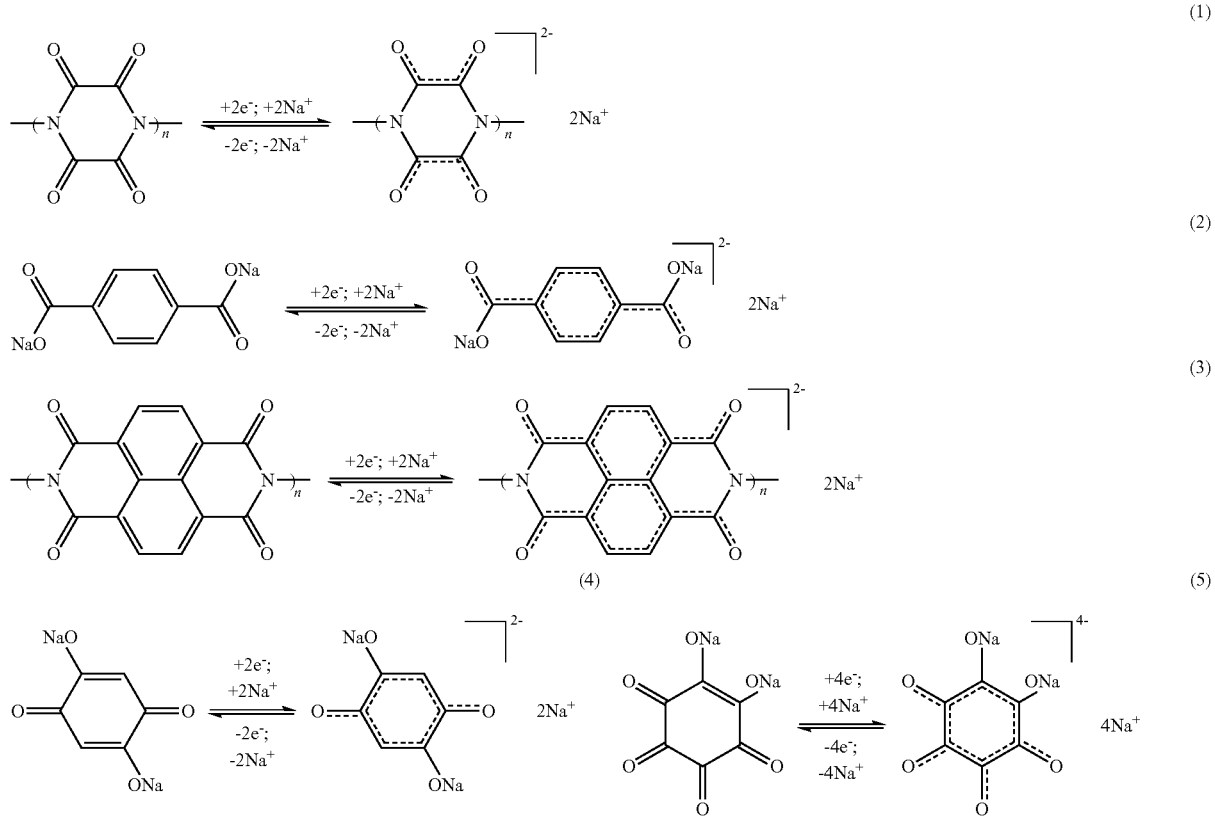

The cyclic organic compound may have a saturated cyclic structure as exemplified in Chemical Formula (1), or may have an unsaturated cyclic structure as exemplified in The cyclic structure of the cyclic organic compound may have a ring composed of a hydrocarbon as exemplified in Chemical Formulae (2), (4) and (5), or may have a heterocycle having a heteroatom as exemplified in Chemical Formulae (1) and (3). The ring may be a five-membered ring, a six-membered ring, a seven-membered ring, or an eight-membered ring. In particular, when the ring is a six-membered ring, the charging and discharging efficiency can be easily further improved.

The number of rings contained in the cyclic structure of the cyclic organic compound may be one as exemplified in Chemical Formulae (1). (2), (4) and (5) or 2 or more as exemplified in Chemical Formula (3). When the number of rings in the cyclic structure is 1 or more and 3 or less, and particularly, 1, the energy density can be easily further improved.

When the cyclic structure of the cyclic organic compound has a plurality of rings, the cyclic structure may have a polycyclic structure in which a plurality of rings are bonded to each other via a single bond or may have a condensed polycyclic structure in which a plurality of rings are condensed with each other. Hereinafter, when an aromatic ring structure is exemplified, specific examples of the aromatic ring structure including one aromatic ring include a structure represented by the following Chemical Formula (6) and specific examples of the aromatic ring structure including two aromatic rings include structures represented by the following Chemical Formula (7) or (8). In particular, in the case of the aromatic ring structure represented by Chemical Formula (6), charging and discharging efficiency is further improved.

(6)

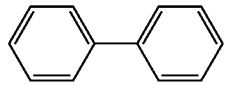

(7)

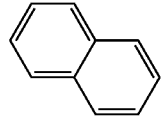

(8)

If the cyclic organic compound is an aromatic compound, when the aromatic compound has an aromatic ring structure and two or more COONa groups bonded to the aromatic ring structure, the number of COONa groups bonded to the aromatic ring structure is 2 or more, and may be any number with which the above charging and discharging reaction can be caused. For example, the number may be 2 or more and 4 or less. In particular, when the number of COONa groups bonded to the aromatic ring structure is 2, the charging and discharging can be further improved.

If the cyclic organic compound is an aromatic compound, when the aromatic compound has an aromatic ring structure and two or more COONa groups bonded to the aromatic ring structure, the COONa group may be bonded to carbon atoms forming the aromatic ring. When the number of COONa groups is 2, the two COONa groups may be bonded at diagonal positions of the aromatic ring structure or may be bonded at positions at which the distance between bonding parts of the two COONa groups is maximized. Here, when two COONa groups are bonded at "diagonal positions of the aromatic ring structure." a line connecting the bonding parts of the two COONa groups crosses the inside of the aromatic ring. That is, in this case, the two COONa groups may be bonded to the aromatic ring structure at the meta position or the para position. In particular, when two COONa groups are bonded to the aromatic ring structure at the para position, the performance of the battery can be easily further improved.

In the sodium ion secondary battery of the present disclosure, among the aromatic compounds, when an aromatic compound having one aromatic ring structure and two COONa groups bonded to the aromatic ring structure is used, the energy density and the charging and discharging efficiency can be easily further improved. In the sodium ion secondary battery of the present disclosure, the aromatic compound may be disodium terephthalate.

The cyclic organic compound can be obtained by a known method, and for example, may be obtained by neutralizing a compound in which 2 or more carboxylic groups are bonded to a predetermined aromatic ring structure with a Na-containing alkaline component such as sodium hydroxide.

In the sodium ion secondary battery of the present disclosure, the cyclic organic compound may be composited with a carbon material. When the cyclic organic compound is composited with a carbon material, the charging and discharging efficiency is further improved. For example, when the cyclic organic compound is subjected to a mechanochemical treatment together with a carbon material, the cyclic organic compound and the carbon material can be composited. In this case, for example, the cyclic organic compound and the carbon material can adhere to each other. A chemical bond may or may not be present between the cyclic organic compound and the carbon material. Whether the cyclic organic compound is composited with a carbon material can be confirmed using, for example, an SEM or TEM.

The carbon material may function as a conductive material. Specific examples of carbon materials include carbon black such as acetylene black, ketjen black, furnace black, and thermal black; carbon fibers such as VGCF; graphite; hard carbon; and coke, in addition, when the crystallinity of the carbon material is high, it is easy to further improve the charging and discharging efficiency of the battery. For example, the carbon material may have an interlayer distance d002 of 3.5 Å or less, 3.45 Å or less or 3.4 Å or less, and 3.3 Å or more. The interlayer distance d002 is an interplanar distance (distance between graphene layers) of the (002) plane in the carbon material and can be determined by an X-ray diffraction method using CuKα as a beam source. In addition, the DG ratio of the carbon material determined by Raman spectroscopy may be 0.80 or less, 0.60 or less, 0.40 or less or 0.20 or less. The DG ratio is a peak intensity of a D-band derived from a defect structure near $1.350$ $cm^{-1}$ to a peak intensity of a G-band derived from a graphite structure near $1.590$ $cm^{-1}$ observed in Raman spectroscopy (a wavelength of 532 nm). Here, when carbon fibers such as VGCF are used as the carbon material, the above interlayer distance and D/G ratio can be easily set within the above range, and it is easy to further improve the charging and discharging efficiency of the battery.

When the cyclic organic compound and the carbon material are composited, the mixing ratio (mass ratio) thereof is not particularly limited. For example, when the total of the cyclic organic compound and the carbon material is set as 100 mass %, the proportion of the carbon material may be 1 mass % or more or 5 mass % or more and 30 mass % or less or 20 mass % or less.

In the sodium ion secondary battery of the present disclosure, the shape of the active material is not particularly limited. The active material may be, for example, in the form of particles. In this case, the average particle size (D50) may be, for example, 1 nm or more or 10 nm or ore, and may be 100 μm or less or 30 μm or less.

2. Solid Electrolyte

Dissolution in a liquid electrolyte (for example, a non-aqueous electrolytic solution) is a concern for the cyclic organic compound. However, in the sodium ion secondary battery of the present disclosure, since a predetermined solid electrolyte is used as an electrolyte, the cyclic organic compound is unlikely to be dissolved in the electrolyte. In addition, when a predetermined solid electrolyte is used, it is easy to reduce the interfacial resistance between the cyclic organic compound as an active material and the solid electrolyte.

The sodium ion secondary battery of the present disclosure includes a complex hydride as a solid electrolyte. In the sodium ion secondary battery of the present disclosure, the solid electrolyte may be composed of only a complex hydride. Alternatively, the complex hydride and a solid electrolyte other than the complex hydride may be combined as necessary. In addition, the complex hydride as a solid electrolyte may be used in combination with an additive such as sodium halide (NaF, NaI, etc.). Here, in the sodium ion secondary battery of the present disclosure, in order to minimize dissolution of the cyclic organic compound, it is preferable that an amount of the liquid electrolyte (for example, a non-aqueous electrolytic solution) contained as an electrolyte be small, and in this regard, the sodium ion secondary battery may be a solid battery that does not substantially contain the liquid electrolyte. However, if a small amount of a liquid electrolyte is supplementarily contained, it is thought that the problem of decrease in the capacity retention rate due to dissolution of the cyclic organic compound is unlikely to occur.

The complex hydride includes a Na cation and a complex ion containing H. The complex ion may have, for example, an element M containing at least one of a non-metal element and a metal element, and H bonded to the element M. In addition, in the complex hydride, a complex ion may be formed while the element M as a central element and H surrounding the element M are bonded to each other via a covalent bond in addition, the complex hydride may be a material represented by the general formula $Na(M_mH_n)$ (sometimes represented by "$Na(MH_n)$"). In this case, m may be any positive number, and n may be any positive number depending on m, the valance of the element M, and the like.

The element M may be a non-metal element or a metal element that can form a complex hydride. For example, the element M may contain at least one of B, C and N or may contain B, as a non-metal element. In addition, for example, the element M may contain at least one of Al, Ni and Fe as a metal element. In particular, when the complex ion contains B or when the complex ion contains C and B, the performance of the battery can be easily further improved.

Specific examples of complex hydrides include, for example, $NaCB_9H_{10}$, $NaCB_{11}H_{12}$, $Na_2B_{10}H_{10}$, $Na_2B_{12}H_{12}$, $NaBH_4$, $NaNH_2$, $NaAlH_4$, and combinations thereof. In particular, when $NaCB_9H_{10}$, $NaCB_{11}H_{12}$, or a combination thereof is used, the performance of the battery can be easily further improved. In the sodium ion secondary battery of the present disclosure, when a plurality of types of complex hydrides are used as the solid electrolyte, the mixing ratio (mass ratio) thereof is not particularly limited, and may be appropriately determined according to the desired performance of the battery.

In the sodium ion secondary battery of the present disclosure, the shape of the solid electrolyte is not particularly limited. The solid electrolyte may be, for example, in the form of particles. In this case, the average particle size (D50) may be, for example, 1 nm or more or 10 nm or more, and may be 100 μm or less or 30 μm or less.

3. Configuration Example of Sodium Ion Battery

FIG. 1 shows an example of a configuration of a sodium ion secondary battery of the present disclosure. As shown in FIG. 1, a sodium ion secondary battery 100 may include a positive electrode active material layer 10, a negative electrode active material layer 20, and a solid electrolyte layer 30. The solid electrolyte layer 30 may be disposed between the positive electrode active material layer 10 and the negative electrode active material layer 20, and one of the positive electrode active material layer 10 and the negative electrode active material layer 20 may contain the cyclic organic compound as an active material, and at least one of the positive electrode active material layer 10 containing a cyclic organic compound, the negative electrode active material layer 20 containing a cyclic organic compound, and the solid electrolyte layer 30 may contain the complex hydride as a solid electrolyte.

3.1 Positive Electrode Active Material Layer

The positive electrode active material layer 10 contains at least a positive electrode active material. The positive electrode active material layer 10 may optionally contain an electrolyte, a conductive material, and a binder in addition to the positive electrode active material.

Regarding the positive electrode active material, the cyclic organic compound can be used. Alternatively, when the cyclic organic compound is used as the negative electrode active material, a material that occludes and releases sodium ions at a potential higher than that of the cyclic organic compound can be used as the positive electrode active material. Examples thereof include Na-containing oxides such as a layered active material, a spinel-type active material and an olivine-type active material. Specific examples of positive electrode active materials other than the cyclic organic compound include $NaFeO_2$, $NaNiO_2$, $NaCoO_2$, $NaMnO_2$, $NaVO_2$, $Na(Ni_xMn_{1-x})O_2$ (0≤X<1), $Na(Fe_xMn_{1-x})O_2$ (0<X<1), $NaVPO_4F$, $Na_2FePO_4F$, and $Na_3V_2(PO_4)_3$. The shape of the positive electrode active material is not particularly limited. The positive electrode active material may be in the form of particles. In this case, the average particle size (D50) may be, for example, 1 nm or more or 10 nm or more, and may be 100 μm or less or 30 μm or less. A higher content of the positive electrode active material in the positive electrode active material layer 10 indicates a larger capacity of the positive electrode. The positive electrode active material layer 10 may contain, for example, 50 mass % or more, 70 mass % or more, 99 mass % or less or 95 mass % or less of the positive electrode active material.

Regarding the electrolyte, a complex hydride similar to the solid electrolyte may be used or an electrolyte different from the solid electrolyte may be used. For example, an oxide solid electrolyte and a sulfide solid electrolyte may be used. In addition, a liquid electrolyte such as a non-aqueous electrolytic solution may be contained as necessary. In the sodium ion secondary battery 100 of the present disclosure, the positive electrode active material layer 10 may contain a complex hydride, the negative electrode active material layer 20 may contain a complex hydride, the solid electrolyte layer 30 may contain a complex hydride, two of these layers may contain a complex hydride, and the positive electrode active material layer 10, the negative electrode active material layer 20 and the solid electrolyte layer 30 may all contain a complex hydride. In the positive electrode active material layer 10, when a complex hydride is used as the solid electrolyte, it is easy to reduce the interfacial resistance between the active material and the solid electrolyte. In addition, it is easy to minimize dissolution of the active material. In the positive electrode active material layer 10, when a solid electrolyte is used, the content thereof is not particularly limited. For example, the positive electrode active material layer 10 may contain 1 mass % or more and 50 mass % or less of the solid electrolyte.

The conductive material may or may not be composited with the cyclic organic compound as described above. In addition, in the positive electrode active material layer 10, the conductive material composited with the cyclic organic compound and the conductive material not composited with the cyclic organic compound may coexist. The conductive material that can be composited with the cyclic organic compound has already been described, and for example, the cyclic organic compound and the carbon material may be composited. On the other hand, the positive electrode active material layer 10 may contain a carbon material, a metal material or the like as a conductive material that is not composited with the cyclic organic compound. Specific examples of carbon materials include carbon black such as acetylene black, ketjen black, furnace black, and thermal black; carbon fibers such as VGCF; graphite; hard carbon; and coke. Examples of metal materials include Fe, Cu, Ni, and Al in order to reduce the irreversible capacity and further improve the charging and discharging efficiency, the conductive material may be a carbon material, and particularly a carbon material having high crystallinity. The crystallinity of the carbon material can be defined by, for example, the interlayer distance d002 and D/G ratio described above. The content of the conductive material in the positive electrode active material layer 10 is not particularly limited. For example, the positive electrode active material layer 10 may contain 1 mass % or more and 50 mass % or less of the conductive material.

Regarding the binder, a binder that is chemically and electrically stable may be used. Specific examples of binders include fluorine-based binders such as a polyvinylidene fluoride (PVDF)-based binder and a polytetrafluoroethylene (PTFE)-based binder, rubber-based binders such as a styrene butadiene rubber-based binder, olefin-based binders such as a polypropylene (PP)-based binder and a polyethylene (PE)-based binder, cellulose-based binders such as a carboxymethyl cellulose (CMC)-based binder, and a polyacrylic acid (PAA)-based binder. The content of the binder in the positive electrode active material layer 10 is not particularly limited, and may be appropriately determined according to desired binding properties.

The positive electrode active material layer 10 may have a certain thickness. The thickness of the positive electrode active material layer 10 is not particularly limited, and may be, for example, 0.1 µm or more and 1 mm or less.

3.2 Negative Electrode Active Material Layer

The negative electrode active material layer 20 contains at least a negative electrode active material. The negative electrode active material layer 20 may optionally contain an electrolyte, a conductive material, and a binder in addition to the negative electrode active material.

The cyclic organic compound can be used as the negative electrode active material. Alternatively, when the cyclic organic compound is used as the positive electrode active material, a material that occludes and releases sodium ions at a potential lower than that of the cyclic organic compound can be used as the negative electrode active material. The negative electrode active material layer 20 may contain, for example, 50 mass % or more, 70 mass % or more, 99 mass % or less or 95 mass % or less of the negative electrode active material.

Regarding the electrolyte, a complex hydride similar to the solid electrolyte may be used or an electrolyte different from the solid electrolyte may be used. In the negative electrode active material layer 20, when a complex hydride is used as the solid electrolyte, it is easy to reduce the interfacial resistance between the active material and the solid electrolyte. In addition, it is easy to minimize dissolution of the active material. In the negative electrode active material layer 20, when a solid electrolyte is used, the content thereof is not particularly limited. For example, the negative electrode active material layer 20 may contain 1 mass % or more and 50 mass % or less of a complex hydride as the solid electrolyte.

The conductive material may or may not be composited with the cyclic organic compound as described above. In addition, in the negative electrode active material layer 20, the conductive material composited with the cyclic organic compound and the conductive material not composited with the cyclic organic compound may coexist. The conductive material that can be composited with the cyclic organic compound has already been described, and for example, the cyclic organic compound and the carbon material may be composited. On the other hand, the negative electrode active material layer 20 may contain the carbon material or metal material described above as a conductive material that is not composited with the cyclic organic compound. The content of the conductive material in the negative electrode active material layer 20 is not particularly limited. For example, the negative electrode active material layer 20 may contain 1 mass % or more and 50 mass % or less of the conductive material.

Regarding the binder, the fluorine-based binder, rubber-based binder, olefin-based binder, cellulose-based binder, polyacrylic acid-based binder, or the like described above may be used. The content of the binder in the negative electrode active material layer 20 is not particularly limited, and may be appropriately determined according to the desired binding properties.

The negative electrode active material layer 20 may have a certain thickness. The thickness of the negative electrode active material layer 20 is not particularly limited, and may be, for example, 0.1 µm or more and 1 mm or less.

3.3 Solid Electrolyte Layer

The solid electrolyte layer 30 contains at least a solid electrolyte. The solid electrolyte layer 30 may optionally contain a binder in addition to the solid electrolyte.

Regarding the solid electrolyte, the complex hydride may be used or a solid electrolyte different from the complex hydride may be used. In particular, when a complex hydride is used as the solid electrolyte, it is easy to reduce the interfacial resistance between the positive electrode active material layer 10 and the solid electrolyte layer 30 and the interfacial resistance between the negative electrode active material layer 20 and the solid electrolyte layer 30. In addition it is possible to minimize dissolution of the cyclic organic compound contained in the positive electrode active material layer 10 or the negative electrode active material layer 20.

Regarding the binder, the fluorine-based binder, rubber-based binder, olefin-based binder, cellulose-based binder, polyacrylic acid-based binder or the like described above may be used. The content of the binder in the solid electrolyte layer 30 is not particularly limited. For example, the solid electrolyte layer 30 may contain 1 mass % or more and 40 mass % or less of the binder.

The solid electrolyte layer 30 may have a certain thickness. The thickness of the solid electrolyte layer 30 is not particularly limited, and may be, for example, 0.1 μm or more and 1 mm or less.

3.4 Other Configurations

The sodium ion secondary battery 100 may include a positive electrode current collector connected to the positive electrode active material layer 10 and a negative electrode current collector connected to the negative electrode active material layer 20. Examples of materials of the positive electrode current collector may include SUS, aluminum, nickel, iron, titanium, and carbon. On the other hand, examples of materials of the negative electrode current collector may include SUS, aluminum, copper, nickel, and carbon. Examples of positive electrode current collectors and negative electrode current collectors may include foil-shaped, mesh-shaped or porous-shaped current collectors.

The sodium ion secondary battery 100 of the present disclosure may include a battery case in which the above layers are accommodated and a terminal connected to the current collector and the like. In addition, the sodium ion secondary battery 100 of the present disclosure may include a restraining member that restrains the layers 10 to 30 in the lamination direction in order to reduce the contact resistance. For these, those the same as in the related art may be used.

The shape of the sodium ion secondary battery 100 of the present disclosure may be, for example, a coin type, a laminated type, a cylindrical type or a square type. The layers 10 to 30 of the sodium ion secondary battery 100 can be produced by, for example, dry molding such as compact molding or wet molding using a slurry. The layers 100 to 30 constituting the sodium ion secondary battery 100 may be laminated to each other and optionally may be subjected to a pressing process to obtain the sodium ion secondary battery 100.

As described above, as in the sodium ion battery of the present disclosure, when the cyclic organic compound as an active material and the complex hydride as a solid electrolyte are used, it is easier to reduce the interfacial resistance between the active material and the solid electrolyte than when an oxide solid electrolyte or a sulfide solid electrolyte is used as the solid electrolyte. In addition, as in the sodium ion secondary battery of the present disclosure, when the cyclic organic compound as an active material and the complex hydride as a solid electrolyte are used, the problem of dissolution of the cyclic organic compound in the electrolyte is unlikely to occur, and it is easy to increase the capacity retention rate of the battery when charging and discharging are repeated.

Here, according to findings of the inventors, as in the sodium ion battery of the present disclosure, when the cyclic organic compound as an active material and the complex hydride as a solid electrolyte are used, hysteresis of the charging and discharging potential becomes small and the energy loss is easily reduced. It is thought that, when the cyclic organic compound as an active material and the complex hydride as a solid electrolyte are used, the resistance is reduced.

1. Example 1

1.1 Composite of Negative Electrode Active Material and Carbon Material

A negative electrode active material and a carbon material were composited with reference to a method described in Japanese Unexamined Patent Application Publication No. 2015-037016 (JP 2015-037016 A). Specifically, disodium terephthalate ($Na_2C_8H_4O_4$, commercially available from Alfer Asear) as the cyclic organic compound, which is a negative electrode active material, and highly crystalline carbon fibers (VGCF-H, commercially available from Showa Denko K.K.) as a carbon material were weighed out so that the mass ratio was 9:1, and put into a $ZrO_2$ pot, and subjected to ball milling with a φ5 mm $ZrO_2$ ball at 190 rpm for 24 hours, and a composite ($Na_2TP/C$) of the negative electrode active material and the carbon material is obtained.

1.2 Synthesis of Complex Hydride as Solid Electrolyte $NaCB_9H_{10}$ (commercially available from Katchem) and $NaCB_{11}H_{12}$ (commercially available from Katchem) were vacuum-dried at 160° C. overnight, and then weighed out so that the molar ratio was 7:3, and then put into a $ZrO_2$ pot, and subjected to ball milling with a φ5 mm $ZrO_2$ ball at 400 rpm for 20 hours to obtain a mixture. The obtained mixture was vacuum-heated at 170° C. overnight to obtain a complex hydride (NaCBH). The obtained complex hydride (NaCBH) had a composition of $Na(CB_9H_{10})_{0.7}(CB_{11}H_{12})_{0.3}$.

1.3 Production of Negative Electrode Mixture

The composite ($Na_2TP/C$), the complex hydride (NaCBH), and the conductive material (VGCF-H, commercially available from Showa Denko K.K.) were mixed so that the mass ratio was 61:32:7, and thereby a negative electrode mixture was obtained.

1.4 Production of Evaluation Battery

The complex hydride (NaCBH) was put into a McCall cylinder, and pressed at 0.1 ton/cm² to form a solid electrolyte layer (separator layer). Subsequently, 10.6 mg of the negative electrode mixture was laminated on the solid electrolyte layer in the cylinder and pressed at 2 ton/cm³ to form a negative electrode active material layer on the surface of the solid electrolyte layer. Next, a Na metal was placed on the surface of the solid electrolyte layer opposite to the negative electrode active material layer and this was used as a counter electrode. Finally, SUS pins were inserted as current collectors from both ends of the layers in the lamination direction, and the layers were sealed in a glass desiccator while being restrained so that the entire contact was maintained. Here, this operation was performed in an Ar glove box.

2. Comparative Example 1

As will be described below, an evaluation battery was produced using a liquid electrolyte as the electrolyte instead of the complex hydride.

The composite ($Na_2TP/C$), the conductive material (acetylene black, commercially available from Denka Co., Ltd.), and the binder (PVDF, commercially available from Kureha Corporation) were weighed out so that the mass ratio was 85:10:5, and dispersed in NMP to obtain a slurry. The obtained slurry was applied to a copper foil, dried, rolled, and punched to a φ16 mm to obtain a negative electrode. Then, in the Ar glove box, an evaluation battery was produced using the obtained negative electrode, $1MNaPF_6$EC:DEC (volume ratio 1:1)(commercially available from Kishida Chemical Co, Ltd.) as a non-aqueous electrolytic solution, and a Na metal as a counter electrode.

3. Comparative Example 2

As will be described below, an evaluation battery was produced using a sulfide solid electrolyte as the electrolyte instead of the complex hydride.

3.1 Synthesis of Sulfide Solid Electrolyte $Na_2S$ (commercially available from Mitsuwa Chemicals Co., Ltd.) and $P_2S_5$ (commercially available from Sigma-Aldrich Co. LLC) were weighed out so that the molar ratio was 3:1, and then put into a $ZrO_2$ pot, and subjected to ball milling with a φ4 mm $ZrO_2$ ball at 510 rpm for 40 hours to obtain a mixture. The obtained mixture was heated at 270° C. for 2 hours to obtain a sulfide solid electrolyte ($Na_3PS_4$). Here, each treatment was performed under an Ar atmosphere.

3.2 Production of Negative Electrode Mixture

The composite ($Na_2TP/C$), the sulfide solid electrolyte ($Na_3PS_4$), and the conductive material (VGCF-H, commercially available from Showa Denko K.K.) were mixed so that the mass ratio was 47:48:5, and thereby a negative electrode mixture was obtained.

3.3 Production of Evaluation Battery 200 mg of the sulfide solid electrolyte ($Na_3PS_4$) was put into a McCall tube and pressed at 1 ton/cm² to form a solid electrolyte layer (separator layer). Subsequently, 13.9 mg of the negative electrode mixture was laminated on the solid electrolyte layer in the cylinder and pressed at 6 ton/cm² to form a negative electrode active material layer on the surface of the solid electrolyte layer. Next, a Na metal was placed on the surface of the solid electrolyte layer opposite to the negative electrode active material layer and this was used as a counter electrode. Finally, SUS pins were inserted as current collectors from both ends of the layers in the lamination direction, and the layers were sealed in a glass desiccator while being restrained so that the entire contact was maintained. Here, this operation was performed in an Ar glove box.

4. Comparative Example 3

As will be described below, an evaluation battery was produced using an oxide solid electrolyte as the electrolyte instead of the complex hydride.

4.1 Production of Negative Electrode Mixture

The composite ($Na_2TP/C$), the oxide solid electrolyte ($Na_3Zr_2Si_2PO_{12}$, NASICON) powder, and the conductive material (VGCF-H, commercially available from Showa Denko K.K.) were mixed so that the mass ratio was 39:57:5, and thereby a negative electrode mixture was obtained.

4.2 Production of Evaluation Battery

A NASICON sintered pellet with a thickness of 3 mm was put into a McCall tube. Subsequently, 16.7 mg of the negative electrode mixture was laminated on the sintered pellet in the cylinder and pressed at 6 ton/cm² to form a negative electrode active material layer on the surface of the solid electrolyte. Next, a Na metal was placed on the surface of the solid electrolyte layer opposite to the negative electrode active material layer and this was used as a counter electrode. Finally. SUS pins were inserted as current collectors from both ends of the layers in the lamination direction, and the layers were sealed in a glass desiccator while being restrained so that the entire contact was maintained. Here, this operation was performed in an Ar glove box.

5. Evaluation by Charging and Discharging Test

The following charging and discharging test was performed on each of the batteries according to Example land Comparative Example 1. Here, no capacity was exhibited in the batteries according to Comparative Examples 2 and 3.

The negative electrode was charged at a current density of 26 mA/g until the voltage reached 0.01 V, charging was stopped for 10 minutes, and discharging was then performed at a current density of 26 mA/g until the voltage reached 2.5 V, and discharging was stopped for 10 minutes. This was repeated over 3 cycles. The discharging capacities of the first cycle, the second cycle, and the third cycle were measured, the discharging capacity of the first cycle was set as 100%, and the discharging capacity retention rate of the second cycle and subsequent cycles was determined. The results are shown in the following Table 1 and FIG. 2.

The potential difference of the main plateau on the charging and discharging curve was measured as hysteresis. The results are shown in the following Table 1,

TABLE 1

| | | Discharging capacity retention rate (%) | | |
| --- | --- | --- | --- | --- |
| | Type of electrolyte | Second cycle | Third cycle | Hysteresis (V) |
| Example 1 | Complex hydride | 94 | 94 | 0.2 |
| Comparative Example 1 | Liquid electrolyte | 82 | 71 | 0.5 |
| Comparative Example 2 | Sulfide | No capacity exhibited | No capacity exhibited | — |
| Comparative Example 3 | Oxide | No capacity exhibited | No capacity exhibited | — |

Figure 2:
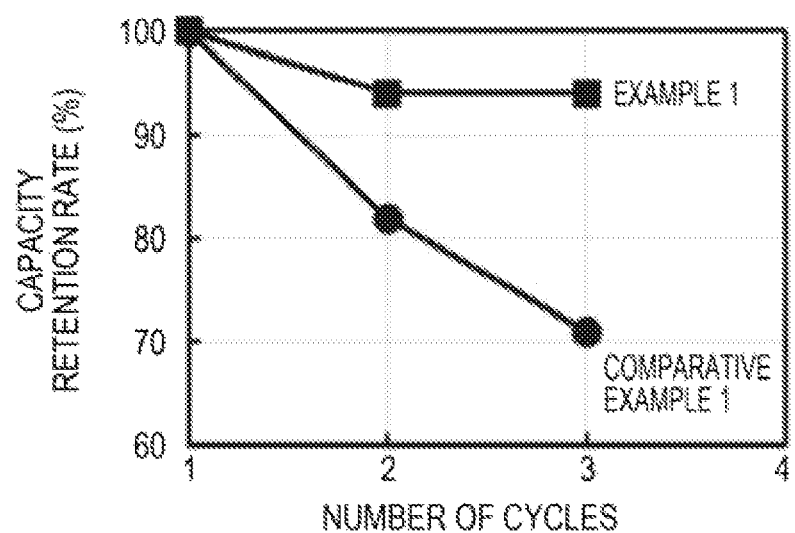
FIG. 2 is a graph in which a capacity retention rate of Example 1 is compared with a capacity retention rate of Comparative Example 1.

As can be clearly understood from the results shown in Table 1 and FIG. 2, the capacity retention rate of the battery according to Example 1 was higher than the capacity retention rate of the battery according to Comparative Example 1. In the battery according to Comparative Example 1, it is thought that, when the cycle was repeated, the cyclic organic compound as the negative electrode active material was dissolved in the liquid electrolyte, and the discharging capacity was significantly reduced. On the other hand, in the battery according to Example 1, it is thought that, since there was no problem of dissolution of the cyclic organic compound as the negative electrode active material, a high capacity retention rate was secured. It is thought that such an effect was exhibited regardless of the type of the cyclic organic compound or the complex hydride.

As can be clearly understood from the results shown in Table 1, the battery according to Example 1 could be charged and discharged, but the batteries according to Comparative Examples 2 and 3 did not exhibit a capacity (a capacity of 1 mAh/g or less) and could not be charged and discharged. It is thought that the batteries according to Comparative Examples 2 and 3 had a large interfacial resistance between the cyclic organic compound as the negative electrode active material, and the sulfide or oxide as the solid electrolyte, and thus could not be charged and discharged. On the other hand, it is thought that the battery according to Example 1 had a small interfacial resistance between the cyclic organic compound as the negative electrode active material, and the complex hydride as the solid electrolyte, and thus could be charged and discharged. It is thought that the softness of the complex hydride or the like contributed to reduction of the interfacial resistance. It is thought that such an effect was exhibited regardless of the type of the cyclic organic compound or the complex hydride.

As can be clearly understood from the results shown in Table 1, the battery according to Example 1 had a smaller charging and discharging potential difference (hysteresis) than the battery according to Comparative Example 1. It is thought that the resistance was reduced by using the cyclic organic compound as the negative electrode active material and the complex hydride as the solid electrolyte. The reason for the decrease in resistance was not clear, but, for example, it is possible that the amount of a decomposition product serving as a resistance substance was reduced. That is, it is thought that the liquid electrolyte was decomposed during charging and discharging to generate a resistance substance in some cases, but the complex hydride was less likely to cause such a problem. It is thought that such an effect was exhibited regardless of the type of the cyclic organic compound or the complex hydride.

As described above, in the sodium ion battery using a predetermined cyclic organic compound as the active material, in order to reduce the interfacial resistance between the active material and the electrolyte and increase the capacity retention rate of the battery when charging and discharging were repeated, it was effective to use a solid electrolyte composed of the predetermined complex hydride as the electrolyte.

Here, an example in which disodium terephthalate was used as the cyclic organic compound, which is the active material, has been exemplified in the above example, but the sodium ion secondary battery of the present disclosure is not limited to this form. It is thought that, when a charging and discharging mechanism as the active material was considered, the same effect was exhibited with a cyclic organic compound having at least two carbonyl groups —C(=O)— and in which the at least two carbonyl groups were bonded via a single bond or at least one conjugated double bond. However, when a cyclic organic compound having an aromatic ring structure and two or more COONa groups bonded to the aromatic ring structure, particularly, disodium terephthalate, was used, the performance of the battery could be easily further improved.

In the above example, an example in which the cyclic organic compound as an active material and the carbon material were composited has been shown, but the sodium ion secondary battery of the present disclosure is not limited to this form. It was thought that the effects (reduction of the interfacial resistance between the active material and the solid electrolyte, and minimizing dissolution of the active material) obtained by the sodium ion secondary battery of the present disclosure were also exhibited when the cyclic organic compound and the carbon material were not composited. However, when the cyclic organic compound and the carbon material were composited, the electron conductivity and the like were improved, and the performance of the battery could be easily further improved.

In the above example, an example in which the complex hydride including a Na cation and a complex ion containing C, B and H was used as the solid electrolyte has been shown, but the sodium ion secondary battery of the present disclosure is not limited to this form. The element constituting the complex ion together with H may be an element other than C and B as long as it can exhibit a function (Na ion conductivity) as the electrolyte. For example, an element M selected from among various non-metal elements and metal elements could be used. However, when the element M contained B, the performance of the battery could be easily further improved.

In the above example, an example in which the complex hydride was used as the electrolyte in both the active material layer and the solid electrolyte layer, has been shown, but the sodium ion secondary battery of the present disclosure is not limited to this form. When the complex hydride was used only in either the active material layer or the solid electrolyte layer, a stronger effect was exhibited than when no complex hydride was used. However, when the complex hydride was used as the solid electrolyte in both the active material layer and the solid electrolyte layer, the performance of the battery could be easily further improved.

In the above example, an example in which a Na metal was used as the counter electrode in order to perform the charging and discharging test for the negative electrode has been shown, but the sodium ion secondary battery of the present disclosure is not limited to this form. A general positive electrode active material layer or the like may be used as the sodium ion secondary battery. Alternatively, the above complex hydride can also be used as the positive electrode active material.

The sodium ion secondary battery of the present disclosure can be widely used for, for example, from small power sources for mobile devices and the like to large power sources for vehicle mounting.

What is claimed is:

1. A sodium ion secondary battery comprising:
   a cyclic organic compound as an active material; and
   a complex hydride as a solid electrolyte,
   wherein the cyclic organic compound has at least two carbonyl groups —C(=O)—, and the at least two carbonyl groups are bonded via a single bond or at least one conjugated double bond, and
   wherein the complex hydride includes $NaCB_9H_{10}$, $NaCB_{11}H_{12}$, or $NaAlH_4$.

2. The sodium ion secondary battery according to claim 1, wherein the cyclic organic compound has an unsaturated cyclic structure.

3. The sodium ion secondary battery according to claim 2, wherein the cyclic organic compound is an aromatic compound, and the aromatic compound has an aromatic ring structure and two or more COONa groups bonded to the aromatic ring structure.

4. The sodium ion secondary battery according to claim 3, wherein the aromatic compound has one aromatic ring structure and two COONa groups bonded to the aromatic ring structure.

5. The sodium ion secondary battery according to claim 1, wherein the cyclic organic compound is composited with a carbon material.

6. The sodium ion secondary battery according to claim 1, wherein a complex ion contains B.

7. The sodium ion secondary battery according to claim 1, including the cyclic organic compound as a negative electrode active material.

8. The sodium ion secondary battery according to claim 1, further comprising:
- a positive electrode active material layer;
- a negative electrode active material layer; and
- a solid electrolyte layer,
- wherein the solid electrolyte layer is disposed between the positive electrode active material layer and the negative electrode active material layer,
- wherein one of the positive electrode active material layer and the negative electrode active material layer contains the cyclic organic compound as the active material, and
- wherein at least one of the positive electrode active material layer containing the cyclic organic compound, the negative electrode active material layer containing the cyclic organic compound, or the solid electrolyte layer contains the complex hydride as the solid electrolyte.

9. The sodium ion secondary battery according to claim 1, wherein the complex hydride includes $NaCB_9H_{10}$.

10. The sodium ion secondary battery according to claim 1, wherein the complex hydride includes $NaCB_{11}H_{12}$.

11. The sodium ion secondary battery according to claim 1, wherein the complex hydride includes $NaAlH_4$.

\* \* \* \* \*